United States Patent Office 3,780,062
Patented Dec. 18, 1973

1

3,780,062
INDOLINE DERIVATIVES
Ado Kaiser, New-Frenkendorf, Wolfgang Koch, Riehen, Marcel Scheer, Basel, and Uwe Wolcke, Bottmingen, Switzerland, assignors to Hoffmann-La Roche Inc., Nutley, N.J.
No Drawing. Filed Oct. 21, 1971, Ser. No. 191,487
Claims priority, application Switzerland, Oct. 30, 1970, 16,050/70
Int. Cl. C07d 27/38
U.S. Cl. 260—326.11 R     4 Claims

ABSTRACT OF THE DISCLOSURE

Indoline derivatives substituted in the 1-position with hydrogen, alkanoyl, benzoyl, alkoxy-carbonyl or o-nitrophenylthio, in the 2-position with a carboxy or ester group and the 5- and 6-positions with an alkanoyloxy or alkoxy group, which are useful as hypotensive, antipyretic and anti-Parkinson agents.

SUMMARY OF THE INVENTION

In accordance with this invention, it has been found that compounds of the formula:

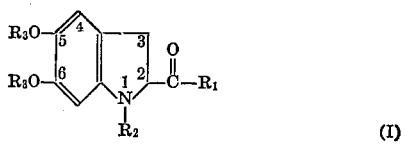

wherein $R_1$ is hydroxy or substituted or unsubstituted alkoxy; $R_2$ is hydrogen, substituted or unsubstituted alkanoyl, substituted or unsubstituted benzoyl, substituted or unsubstituted alkoxycarbonyl, or o-nitrophenylthio; and $R_3$ is substituted or unsubstituted alkanoyl or substituted or unsubstituted alkyl; with the proviso that when $R_2$ and $R_3$ are both alkanoyl, at least one of these alkanoyl groups is a substituted alkanoyl;

and salts thereof with acids or bases, are useful as hypotensive, antipyretic and anti-Parkinson agents.

The compounds of Formula I are obtained by treating a compound of the formula:

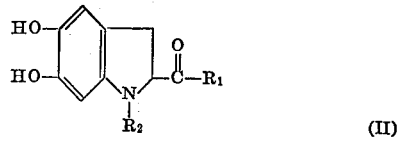

wherein $R_1$ and $R_2$ are as above;

or a salt thereof, with an acylating agent or an alkylating agent, provided that when $R_2$ is hydrogen, $R_3$ is substituted alkanoyl, substituted or unsubstituted benzoyl or unsubstituted alkoxycarbonyl.

The compounds of Formula I are also obtained by esterifying an acid of the formula:

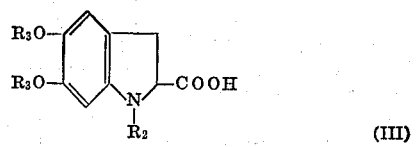

wherein $R_2$ and $R_3$ are as above;

or a salt thereof.

2

The compounds of Formula I are further obtained by the mild, basic hydrolysis of an ester of the formula:

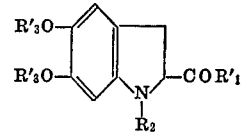

wherein $R_2$ is as above; $R'_1$ is substituted or unsubstituted alkoxy; and $R'_3$ is unsubstituted or substituted alkyl; with the proviso that $R'_1$ is not tertiary alkoxy.

The compounds of Formula I wherein $R_2$ is hydrogen can be obtained by reduction of or by treatment with hydrogen bromide or trifluoroacetic acid of a compound of Formula I wherein $R_2$ is benzyloxycarbonyl. The compounds of Formula I wherein $R_2$ is hydrogen can also be obtained by treating with an acid agent a compound of Formula I wherein $R_2$ is lower t-alkoxy-carbonyl or o-nitrophenylthio. The compounds of Formula I wherein $R_2$ is hydrogen can further be obtained by hydrolyzing a compound of Formula I wherein $R_2$ is an acid group and $R_3$ is substituted or unsubstituted alkyl.

DETAILED DESCRIPTION OF THE INVENTION

As used throughout this application, the term "alkyl comprehends straight-chain and branched-chain, saturated aliphatic hydrocarbon groups containing from 1 to 18 carbon atoms, preferably 1 to 7 carbon atoms, such as methyl, ethyl and n-heptyl. The alkyl group may be unsubstituted alkyl or substituted by an alkenyl, alkynyl or alkoxyalkyl group.

As used herein, the term "alkenyl comprehends straight-chain and branched chain, unsaturated aliphatic hydrocarbon groups having at least one double bond and containing from 2 to 18 carbon atoms, preferably 2 to 7 carbon atoms, such as vinyl, propenyl and butenyl. As used herein, the term "alkynyl comprehends straight-chain and branched chain, unsaturated aliphatic hydrocarbon groups having at least one triple bond and containing from 2 to 18 carbon atoms, preferably 2 to 7 carbon atoms, such as propynyl, butynyl and hexynyl.

As used herein, the alkenylalkyl groups preferably contain from 3 to 7 carbon atoms, such as allyl, 2-butenyl and 2,4-pentadienyl. As used herein, the alkynylalkyl groups preferably contain from 3 to 7 carbon atoms, such as 2-propynyl.

As used herein, the term "alkoxy comprehends straight-chain and branched-chain alkyloxy groups containing from 1 to 18 carbon atoms, preferably 1 to 7 carbon atoms, such as methoxy, pentoxy, and butoxy. The alkoxy group may be unsubstituted or substituted with an alkenyl, alkynyl or phenyl group. As used herein, the alkenylalkoxy and alkynylalkoxy groups preferably contain from 3 to 7 carbon atoms, such as allyloxy, 2-butenyloxy-2,4-pentadienyloxy and 2-propynyloxy.

As used herein, the term "substituted or unsubstituted alkanoyl" comprehends alkanoyl groups of the formula:

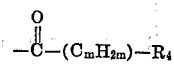

wherein $R_4$ is hydrogen, alkoxy or

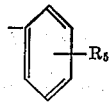

$R_5$ is hydrogen, alkoxy or halo; and $m$ is an integer of from 1 to 17, preferably 1 to 7;

such as acetyl, propionyl, valeryl, hexanoyl and isobutyryl.

As used herein, the term "substituted or unsubstituted alkoxycarbonyl" comprehends alkoxycarbonyl groups of formula:

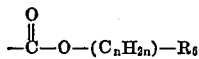

wherein $R_6$ is hydrogen or phenyl and $n$ is an integer of from 1 to 18, preferably 1 to 8;

such as methoxycarbonyl, 6-butoxycarbonyl and propyloxycarbonyl.

As used herein, the term "substituted or unsubstituted benzoyl" comprehends benzoyl groups of the formula:

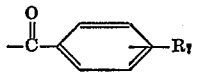

wherein $R_7$ is hydrogen, alkoxy or halo.

As used herein, the term "halo" or "halogen," unless otherwise stated, comprehends fluorine, chlorine, bromine and iodine, preferably chlorine and bromine.

As mentioned above, the compounds of Formula I of this invention (the DL-, D- and L-forms) and their salts are pharmacodyamically active, particularly the L-form. They are characterized by numerous actions on the nervous system. In particular, they possess hypotensive, antipyretic and anti-Parkinson properties.

The compounds of Formula I and their salts can be used as medicaments, for example, in the form of pharmaceutical preparations which contain them in association with a compatible pharmaceutical carrier. This carrier can be an organic or inorganic, inert carrier material which is suitable for enteral or parenteral administration such as for example, water, gelatin, gum arabic, lactose, starches magnesium stearate, talc, vegetable oils, polyalkylene glycols, petroleum jelly, etc. The pharmaceutical preparations can be made up in solid form (e.g. as tablets, dragees, suppositories or capsules) or in liquid form (e.g. as solutions, suspensions or emulsions). The pharmaceutical preparations may be sterilized and/or may contain adjuvants such as preserving, stabilizing, wetting or emulsifying agents, salts for varying the osmotic pressure or buffers. They may also contain other therapeutically valuable substances.

A pharmaceutical preparation in dosage unit form can expediently contain about 10 mg. to about 1000 mg. of active ingredient.

The amount of active ingredient to be administered per day is governed by the particular case. In general, in the case of oral administration, an amount of active ingredient of from about 0.1 to about 4 g., especially about 1.5 to about 3 g., can be administered. In the case of intravenous administration, the amount of active ingredient administered per day can lie between about 10 mg. and about 2 g., especially about 1 g.

The administration is expediently effected in individual doses divided over the day.

Certain of the indoline derivatives provided by this invention are also valuable intermediates for the preparation of pure indoline compounds of the formula:

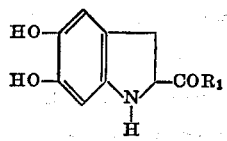

wherein $R_1$ is as above;

which are also useful as hypotensive, antipyretic and anti-Parkinson agents.

In accordance with this invention, the preferred compounds of Formula I are the indoline derivatives which exist in the L- or D,L-form, particularly the L-form. Among these preferred compounds, particularly preferred are the indoline compounds of Formula I wherein $R_1$ is hydroxy or methoxy, $R_2$ is hydrogen, benzyloxycarbonyl or phenacetyl, and $R_3$ is acetyl and the salts thereof and the indoline compounds of Formula I wherein $R_2$ is hydrogen and $R_1$ and $R_3$ are as above and the salts thereof.

The acylation of a compound of Formula II or salts thereof can be carried out by treatment in a conventional manner with the corresponding acid halide, preferably the chloride or bromide, acid anhydride or acid azide furnishing the $R_3$ acid group.

Alternatively, the compound of Formula II can be treated with an activated ester, the acid group of the activated ester yielding the $R_3$ group which is to be introduced. In carrying out the treatment with an activated ester, there can be used, for example, an ester of the corresponding acid with N-hydroxysuccinimide, N-hydroxy-phthalimide or p-nitrophenol. The introduction of the $R_3$ acid group is preferably carried out with the addition of a basic agent, such as an alkali metal carbonate, preferably potassium carbonate, magnesium oxide, pyridine, or triethylamine. This reaction can be carried out in an inert organic solvent. In this reaction, any conventional inert organic solvent can be utilized, such as benzene, toluene, methylene chloride, tetrahydrofuran, dimethylformamide or dimethyl sulphoxide. In carrying out this reaction, temperature and pressure are not critical, and in general, the reaction can be carried out at from about 0° C. to the boiling point of the reaction mixture and at atmospheric pressure. However, this reaction can also be carried out in an aqueous medium, in which case the aqueous medium can contain an inert organic solvent such as, for example, tetrahydrofuran, dioxane, dimethyl sulphoxide or dimethylformamide. The reaction is then preferably carried out at a pH between about 5 and 9, which is preferably achieved by the simultaneous addition of an alkali metal hydroxide, preferably sodium hydroxide or potassium hydroxide. In carrying out this reaction, temperature and pressure are not critical and the reaction can be carried out in an aqueous medium from about 0° C. to about 50° C. and at atmospheric pressure.

The O,O acylation of a compound of Formula II in which $R_2$ is hydrogen can be carried out using an acylating agent which furnishes a substituted alkanoyl group, a substituted or unsubstituted benzoyl group or an unsubstituted alkoxycarbonyl group. In carrying out this acylation, at least three equivalents of the acylating agent should be used per mole of the compound Formula II. In this manner, there is obtained the correspondingly N/O,O'-triacylated compounds of Formula I.

The alkylation of a compound of Formula II can be carried out by treating the compound of Formula II, in which $R_2$ is not hydrogen, with a compound selected from the group consisting of compounds of the formula:

$$R''_3Z \qquad (V\text{-}A)$$

or $$(R''_3)_2SO_4 \qquad (V\text{-}B)$$

wherein $R''_3$ is unsubstituted alkyl and Z is a leaving atom or group.

In carrying out this reaction, any conventional leaving atom or group can be utilized. Among the preferred leaving atoms or groups are a halogen, especially chlorine, bromine or iodine atom, or a substituted sulphonyloxy group such as a lower alkanesulphonyloxy group, particularly methanesulphonyloxy, a benzenesulphonyloxy group, a lower alkylbenzenesulphonyloxy group, particularly p-toluenesulphonyloxy, or a halobenzenesulphonyloxy group, particularly p-bromobenzenesulphonyloxy. The treatment is preferably carried out in the presence of an alkali metal carbonate such as potassium carbonate or sodium carbonate or in the presence of an aqueous alkali metal hydroxide, preferably sodium or potassium hydroxide. If desired, the starting material of Formula II can first be converted, in a conventional manner, into the corresponding alkali metal salt at the two phenolic hydroxy groups (e.g. by treatment with an alkali metal hydride) and subsequently treated with the agent furnishing the $R''_3$ group.

The alkylation of the compounds of Formula II can be expediently carried out in an inert organic solvent. In this reaction any conventional inert organic solvent such as acetone, dimethylformamide, dimethyl sulphoxide or tetrahydrofuran can be utilized. In this reaction, temperature and pressure are not critical, and the reaction can be carried out at from about 0° C. at the boiling point of the reaction mixture and at atmospheric pressure. In carrying out the alkylation under anhydrous conditions, a compound of Formula II wherein $R_1$ is hydroxy is converted into the corresponding ester, wherein $R_1$ is unsubstituted or substituted alkoxy.

The esterification of an acid of Formula III can be carried out by reaction with the corresponding diazo compound (e.g. diazomethane, diazoethane, diphenyl diazomethane etc.). This reaction is preferably carried out in the presence of an inert organic solvent. In carrying out this reaction, any conventional inert organic solvent can be utilized, such as diethyl ether, tetrahydrofuran, dioxane, dimethylformamide, methylene chloride or acetic acid ethyl ester. In carrying out this reaction, temperature and pressure are not critical, and the reaction can be carried out at a temperature of from about 0° C. to the boiling point of the reaction mixture and at atmospheric pressure.

The acid of Formula III can also be esterified by reacting the acid with the corresponding olefin, which will yield the ester group. This reaction is preferably carried out in the presence of a strong acid such as, for example, p-toluenesulphonic acid, sulphuric acid or hydrochloric acid. A Lewis acid (e.g. boron trifluoride) can also be used. The reaction is preferably carried out in an organic solvent. In this reaction, any conventional inert organic solvent may be utilized, such as, for example, tetrahydrofuran, dioxane, dimethylformamide or dimethyl sulphoxide. Alternatively, a large excess of the olefin can be used, whereby it then simultaneously serves as the solvent. In this reaction, temperature and pressure are not critical, and the reaction temperature can be carried out at from −30° C. to +70° C. and at atmospheric pressure. The reaction can, if desired, also be carried out under pressure such as at about 50 atmospheres (gauge).

A further method for the esterification of an acid of Formula III comprises reacting the acid with an inorganic base such as, for example, potassium carbonate or with a substituted organic base such as triethylamine or dicyclohexylamine and with a compound of the formula:

$$R_8Z \quad (VI-A)$$

or

$$(R_8)_2SO_4 \quad (VI-B)$$

wherein $R_8$ is unsubstituted alkyl, alkenylalkyl, alkynylalkyl or phenylalkyl and Z is as above.

This reaction is preferably carried out in the presence of an inert organic solvent. In this reaction, any conventional inert organic solvent can be utilized, such as dimethylformamide, dimethyl sulphoxide and tetrahydrofuran. In carrying out this reaction, temperature and pressure are not critical, and the reaction can be carried out at a temperature of from about 0° C. to the boiling point of the reaction mixture and at atmospheric pressure.

The compounds of Formula III in which $R_3$ is unsubstituted alkyl, alkenylalkyl or alkynylalkyl can also be esterified by reaction with the corresponding alcohol furnishing the $R_1$ group. This reaction is preferably carried out in the presence of an acidic catalyst such as hydrochloric acid, sulphuric acid, p-toluenesulphonic acid or thionyl chloride. This reaction is preferably carried out in a large excess of the alcohol, whereby the alcohol simultaneously serves as the solvent and reagent. The temperature and pressure at which this reaction is carried out is not critical, and the reaction can be carried out from about 0° C. to the boiling point of the reaction mixture. In the foregoing esterification methods, a $R_2$ t-alkoxycarbonyl group or $R_2$ o-nitrophenylthio group which may be present is cleaved off.

The mild basic hydrolysis of an ester of Formula IV can be carried out by treating an aqueous or lower-alkanolic solution of the ester, with a mild aqueous base. The aqueous or lower-alkanolic solution can also contain an inert organic solvent, such as tetrahydrofuran or dioxane. In carrying out this reaction, any conventional mild base can be utilized, preferably a dilute inorganic base, particularly sodium hydroxide, potassium hydroxide or ammonia, or a quaternary ammonium hydroxide, particularly tetramethylammonium hydroxide. A non-quaternary organic base particularly aqueous triethylamine or aqueous pyridine, can also be used. In this reaction, temperature and pressure are not critical, and the reaction can be carried out at room temperature and atmospheric pressure or at greater or lesser temperatures and pressures. Generally, the mild basic conditions for the hydrolysis are preferably achieved by carrying out the hydrolysis at a temperature of between about 0° C. and 50° C.

Where a compound of Formula I is obtained in which $R_2$ is an acid group, this acid residue can be cleaved off in the manner described hereinafter while retaining the O,O'-substitution. By this procedure there are obtained the selectively O,O'-substituted/N-unsubstituted compounds of Formula I which are a preferred group of indoline derivatives provided by the present invention.

The cleaving off of an $R_2$ acid group can be carried out as follows.

(A) When $R_2$ is benzyloxycarbonyl, the $R_2$ group can be cleaved off by reduction. Reduction can be carried out by treatment with catalytically activated hydrogen. As catalysts there can be used, for example, palladium, Raney-nickel, platinum or ruthenium. It is preferred to carry out the catalytic hydrogenation in an inert solvent, particularly water, a lower alkanol, quite particularly methanol or ethanol, an organic acid, quite particularly acetic acid, or dimethylformamide, tetrahydrofuran or dimethyl sulphoxide. In carrying out this reaction, temperature and pressure are not critical, and the reaction can be carried out at about 0° C. to 80° C. and at atmospheric pressure. Unsaturated groups which are present in the molecule are converted into saturated groups during this hydrogenation.

An $R_2$ benzyloxycarbonyl group in a compound of Formula I in which $R_3$ is alkenylalkyl or alkynylalkyl and $R_1$ is hydroxy can also be cleaved off by conventional treatment with an alkali metal, preferably sodium, in liquid ammonia.

An $R_2$ benzoyloxycarbonyl group can, furthermore, be split off by treatment with hydrogen bromide in an inert organic solvent such as glacial acetic acid, nitromethane, chloroform, ethyl acetate or diethyl ether, or by treatment with trifluoroacetic acid, if desired with the addition of phenol, resorcinol or anisol. In carrying out this acid cleavage, temperature and pressure are not critical and the reaction can be expediently carried out at a temperature between about room temperature and the boiling point of the reaction mixture, preferably at an elevated temperature, and at atmospheric pressure.

(B) When $R_2$ is lower t-alkoxycarbonyl, especially t-butoxycarbonyl, or o-nitrophenylthio, the $R_2$ group can be cleaved off by treatment with an acidic agent. The cleaving off of a t-alkoxycarbonyl group is preferably carried out in an organic solvent such as, for example, glacial acetic acid, ethyl acetate, methylene chloride, ether or tetrahydrofuran. As acidic agents for this cleavage there are preferably used strong acids such as hydrochloric acid, p-toluenesulfphonic acid, trifluoroacetic acid or gaseous hydrogen chloride. This cleavage is preferably carried out at a temperature of from about 0° C. to 70° C.

The cleaving off of the $R_2$ o-nitrophenylthio group can be carried out by treatment in an inert organic solvent, such as glacial acetic acid, diethyl ether, tetrahydrofuran or chloroform, with gaseous hydrochloric acid. The cleaving off can also be carried out by treatment with a mineral acid such as, for example, hydrochloric acid or sulphuric acid at a pH between about 1 and 4 in an aqueous solution. The cleavage in aqueous solution can be carried out in the presence of an inert organic solvent, such as tetrahydrofuran, dimethylformamide, dimethyl sulphoxide or a lower alkanol and in the presence of thiophenol, thioacetamide or rhodanine. In carrying out this reaction, temperature and pressure are not critical, and a temperature and pressure of about 0° C. to the boiling point of the mixture and atmospheric pressure can be utilized.

(C) An $R_2$ substituent present in a compound of Formula I in which $R_3$ is substituted or unsubstituted alkyl can be cleaved off hydrolytically without the removal of the $R_3$ substituent. Such hydrolysis can be carried out either in an acidic or in a basic medium. For the acidic hydrolysis, there is preferably used an aqueous mineral acid, such as hydrochloric acid or sulphuric acid, or toluenesulphonic acid. In this acid hydrolysis, the medium can, if desired, be an admixture with an inert organic solvent such as a lower alkanol, glacial acetic acid or dioxane. For the basic hydrolysis there is preferably used an aqueous caustic alkali metal hydroxide such as sodium or potassium hydroxide. In this basic hydrolysis, the medium can, if desired, be an admixture with an inert organic solvent such as a lower alkanol, dioxane or dimethyl sulphoxide. The hydrolysis is preferably carried out at a temperature between about 0° C. and the boiling point of the mixture.

Racemates of Formula I can be resolved, for example, by subjecting an acid of Formula I to a fractional crystallization with an optically active base. In carrying out this resolution, any conventional optically active base can be utilized, such as quinine, brucine, dehydroabiethylamine, (+)- or (—)-ephedrine or (+)- or (—)-α-methylbenzylamine. The optically active forms can, however, also be obtained by using pure optically active starting materials.

Acids of Formula I form salts with bases. Such salts include, for example, the disodium, dipotassium and diammonium salts. Those compounds of Formula I in which $R_2$ represents a hydrogen atom also form acid addition salts. Such salts include, for example, the hydrochloride, hydrobromide, oxalate, tartrate or maleate.

The starting materials of Formula II hereinbefore can be prepared, for example, as follows:

A phenylalanine derivative of the formula:

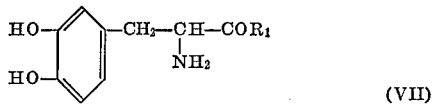

(VII)

wherein $R_1$ is as above;

is converted by oxidation with an inorganic oxidizing agent into a compound of the general formula:

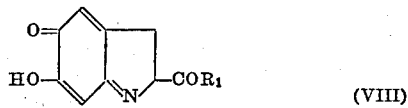

(VIII)

wherein $R_1$ is as above.

In carrying out this oxidation, any conventional inorganic oxidizing agent can be utilized, with potassium hexacyanoferrate (III), silver oxide or manganese dioxide being preferred. This oxidation reaction can be carried out in water under acidic or basic conditions, preferably at a pH of about 3 to about 9. In carrying out this oxidation reaction, temperature and pressure are not critical, and the reaction can be carried out at room temperature (22° C.) and at atmospheric pressure. Generally, a temperature of —30° C. to +50° C. is preferred.

The oxidation product of Formula VIII can subsequently be reduced, preferably in situ, with the aid of an inorganic reducing agent into the corresponding indoline compoud of the formula:

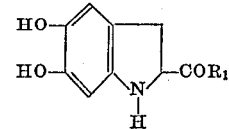

(A-II)

wherein $R_1$ is as above.

In carrying out this reaction, any conventional inorganic reducing agent can be utilized, with the alkali metal dithionites being preferred, particularly soduim dithionite. This reduction reaction can be carried out in water. In carrying out this reaction, temperature and pressure are not critical, and the reaction can be carried out at room temperature and atmospheric pressure.

Those phenylalanine derivatives of Formula VII wherein $R_1$ is alkenylalkoxy or alkynylalkoxy (e.g. 2-butenyloxy, allyloxy, 2-propionyloxy) are novel. They can be obtained, for example, by esterifying the corresponding acid of Formula VII with an alkenyl- or alkynyl-substituted alkanol, especially in the presence of an acidic catalyst such as hydrochloric acid, p-toluenesulphonic acid or thionyl chloride. The alcohol can be used in a large excess, whereby it then simultaneously serves as the solvent. In carrying out this reaction, temperature and pressure are not critical, and the reaction can be carried out at room temperature and atmospheric pressure.

For the preparation of a starting material of Formula II in which $R_2$ is an acid group, a compound of Formula II-A or a salt thereof can be dissolved in solution and, while maintaining a pH value of at least about 7, treated with boric acid or a borate salt. Borax is preferably used, although other salts of boric acid such as, for example, the alkali metal metaborates (e.g. sodium metaborate) and the alkali metal pentaborates (e.g. potassium pentaborate) can also be used. Water is preferably used as the solvent, although mixtures of water with an inert solvent such as, for example, tetrahydrofuran, dioxane, dimethyl sulphoxide or dimethylformamide can also be used. In this reaction, temperature and pressure are not critical, and the reaction can be carried out at a temperature of between about 0° C. and about 70° C. and at atmospheric pressure. The treatment is preferably carried out while maintaining a pH of between about 7 and 11, this being expediently achieved by the addition of caustic alkali or an organic base such as triethylamine or pyridine.

The treatment of an indoline compound of Formula II-A or of a salt thereof with boric acid or with a borate salt yields a boric acid complex of a compound of Formula II-A or of a salt thereof wherein the two phenolic hydroxy groups are esterified with boric acid.

This boric acid complex can subsequently be reacted with an agent furnishing an acid group to give a boric acid complex of a compound of Formula II, in which $R_2$ is other than hydrogen, or of a salt thereof. This reaction can be carried out, for example, by reacting a boric acid complex of a compound of Formula II-A or of a salt thereof with the corresponding acid halide, preferably the chloride or bromide, or with the corresponding acid anhydride or acid azide. The reaction medium, temperature and pH utilized for the introduction of the acid group are preferably the same as were utilized in the preparation of a boric acid complex of a compound of Formula II-A.

The resulting boric acid complex of a compound of Formula II, in which $R_2$ is other than hydrogen, or of a salt thereof is subsequently subjected to an acidic hydrolysis. Preferably, the basic aqueous solution prepared in the manner described earlier is adjusted to a pH of about 1–4 with an acidic agent. The boric acid complex is thereby cleaved, and there is obtained a starting material of Formula II in which $R_2$ is other than hydrogen. As acidic agents there are preferably used mineral acids such as sulphuric acid, hydrochloric acid, phosphoric acid etc. The hydrolysis is preferably carried out using the same solvents and at the same temperature as in the preparation described herein before of a boric acid complex of a compound of Formula II–A.

The preparation of the starting materials of Formula II in which $R_2$ is other than hydrogen is preferably carried out in situ starting from an indoline compound of Formula II–A. The boric acid complexes obtained are preferably converted in solution directly (i.e. without isolation) into the starting materials of Formula II in which $R_1$ is other than hydrogen.

The indoline derivatives of Formula II–A can be obtained in a pure form from the indoline derivatives of the formula:

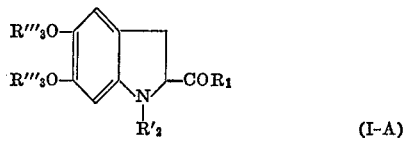

(I–A)

wherein $R_1$ is as above; $R'_2$ is hydrogen, benzyloxycarbonyl, t-alkoxycarbonyl or o-nitrophenylthio; and $R'''_3$ is substituted or unsubstituted alkanoyl or unsubstituted alkoxycarbonyl.

The compounds of Formula II–A are sensitive to atmospheric oxygen and in their direct synthesis by oxidation of the phenylalanine of Formula VII and subsequent reduction of the compounds of Formula VIII obtained, they are obtained in admixture with large amounts of inorganic material. It is practically impossible to separate the indoline compounds of Formula II–A from the impurities in these mixtures in a conventional manner without their being substantially oxidized. The indoline compounds of Formula II–A can, however, be converted in the crude state, according to this invention, into indoline derivatives of Formula I–A which are substantially more stable to atmospheric oxygen and which can be isolated by customary working-up methods (e.g. by extraction with an organic solvent) from the impurities occurring during the synthesis without substantial losses.

The compounds of Formula II–A can be obtained from the compounds of Formula I–A by cleaving off the $R'''_3$ acid group and any $R'_2$ acid group by acidic hydrolysis. If desired, the $R'_2$ benzyloxycarbonyl group which may be present by reduction or by treatment with hydrogen bromide or trifluoroacetic acid or the $R'_2$ t-alkoxycarbonyl or o-nitrophenylthio group which may be present by treatment with an acidic agent can be cleaved off before cleaving of the $R'''_3$ acid group.

The cleaving off of the $R'''_3$ acid group can be carried out hydrolytically in an acidic medium. For the acidic hydrolysis there is preferably used an aqueous mineral acid, such as hydrochloric acid or sulphuric acid or p-toulenesulphonic acid. If desired, the medium can be an admixture with an inert organic solvent (e.g. a lower alkanol, glacial acetic acid or dioxane). Ester groups which may be present in the molecule are converted into carboxy groups during this hydrolysis. An $R'_2$ acid group which may be present is likewise cleaved off during the hydrolytic cleavage of the $R'''_3$ group.

An $R'_2$ acid group is a compound of Formula I–A can be cleaved off in the manner described earlier under (A) or (B) for the cleavage of an $R_2$ acid group. The compound of Formula I–A obtained in which $R'_2$ is hydrogen can, if desired, be isolated and purified. This O,O-acylated/N-unsubstituted compound of Formula I–A can subsequently be converted into an indoline compound of Formula II–A by acidic hydrolysis, for example, in the manner described earlier.

In the conversion into the indoline compounds of Formula II–A, optically active compounds of Formula I–A employed are not racemized. Since the optical configuration is also retained in the conversion of compounds of Formula II–A into compounds of Formula I–A, there is provided a process for the purification of compounds of Formula II–A via the compounds of Formula I–A according to which optical isomers of Formula I which are to be purified can be recovered without racemization. This is of preparative advantage.

The examples which follow illustrate the invention.

Example 1

37 g. of crude N-benzyloxycarbonyl-L-cyclodopa is rinsed into a reaction vessel which has been gassed with argon, with a total of 500 ml. of water and 59 ml. of 2 N sodium hydroxide. At the beginning of the reaction, the starting material is not completely dissolved. The mixture is immediately adjusted to pH 7 with acetic anhydride. 45.5 of acetic anhydride and 2 N sodium hydroxide are then alternately added dropwise within 2 hours at an internal temperature of 0°–3° C. in such a way that the pH remains between 6.5 and 7.5. The mixture is then stirred for a further 1 hour. It is filtered off from viscous residues by suction, and the filtrate is adjusted to pH 1 with 6 N sulphuric acid, then extracted once with 1.5 liters of ethyl acetate and once more with 0.5 liter of ethyl acetate. The organic phase is washed with water, dried over sodium sulphate/animal charcoal and evaporated under reduced pressure with the addition of a little toluene. The evaporation residue is chromatographed on 2.5 kg. of kieselgel with chloroform/glacial acetic acid (10:1 parts by volume). After one recrystallization from toluene/ethyl acetate, there is obtained O,O'-diacetyl-N-benzyloxycarbonyl-L-cyclodopa of melting point 156°–157° C.; $[\alpha]_D^{25} = -40.4°$ (c.=0.5%; tetrahydrofuran).

Example 2

Three solutions are prepared as follows:

Solution 1.—82 g. of potassium hexacyanoferrate (III) is dissolved in 200 ml. of water.

Solution 2.—20.8 g. of sodium bicarbonate is dissolved in 400 ml. of water under argon on a steam-bath. To this solution there is added 9.32 of finely powdered L-dopa, which is likewise dissolved under argon on a steam-bath; the solution is then cooled to room temperature (22° C.).

Solution 3.—Simultaneously with the preparation of solution 2, 80 g. of sodium bicarbonate is dissolved in 600 ml. of water on a steam-bath and cooled to room temperature. 56 g. of sodium dithionite monohydrate is added to the cooled solution, and the reaction is then started immediately.

Solution 2 is placed in a sulphonating flask which has been previously gassed with argon and vigorously stirred. Solution 1 is added and then, after 30 seconds, solution 3 is added. After a further 10 seconds, 280 ml. of concentrated hydrochloric acid is run in as rapidly as possible from a dropping funnel. The mixture is then immediately evaporated under reduced pressure at a bath-temperature of 40° C. after the addition of a small amount of toluene. The residue consists of crude L-cyclodopa (L-5,6-dihydroxy-indoline-2-carboxylic acid).

Three of the batches described hereinbefore are each dissolved in a solution of 34 g. of borax in 600 ml. of water at 10° C. under argon and rinsed into the reaction vessel which has been gassed with argon. 360 ml. of dioxane is added, and the mixture is adjusted to pH 9 with 28% by weight aqueous sodium hydroxide. 25.5 g. of benzyloxycarbonyl chloride and 2 N sodium hydroxide are then alternately added dropwise within 2 hours at an internal temperature of 10°–15° C. in such a way that the pH remains between 8.9 and 9.2. The mixture is stirred for a further 1 hour, then thoroughly stirred with 2 liters of ethyl acetate and filtered off by suction. The residue is rinsed with a small amount of water and ethyl acetate. The organic phase is discarded. The aqueous phase is adjusted to pH 1 with 5 N hydrochloric acid and extracted three times with a total of 6 liters of ethyl acetate. The extract is washed with saturated aqueous sodium chloride solution, dried over sodium sulphate/animal charcoal and evaporated with the addition of a small amount of toluene. A reddish evaporation residue is obtained, which is chromatographed on kieselgel with chloroform/methanol (1:1 parts by volume) for purification. The product which is thus pre-purified is recrystallized from water with the addition of a small amount of ethanol, oily impurities first precipitating. There is obtained N-benzyloxy-carbonyl-L-cyclodopa of melting point 211°–213° C. (decomposition); $[\alpha]_D^{25} = 66.8°$ (c.=0.5%; methanol).

Example 3

25.6 g. of crude N-phenacetyl-L-cyclodopa is mixed under argon with 600 ml. of water and 60 ml. of 2 N sodium hydroxide. The mixture is adjusted to pH 7 by the addition of acetic anhydride, and alternately treated dropwise within 2 hours at an internal temperature of 0°–3° C. with 60.8 ml. of acetic anhydride and 2 N sodium hydroxide in such a way that the pH remains between 6.5 and 7.5. The mixture is stirred for 2 hours, then adjusted to pH 1 with 6 N sulphuric acid and exhaustively extracted with a total of 3 liters of ethyl acetate. The extract is washed with a saturated aqueous sodium chloride solution, dried over sodium sulphate/animal charcoal and evaporated under reduced pressure after the addition of a small amount of toluene. The residue is dissolved in boiling ethyl acetate. The solution is decolorized with charcoal. The filtrate is concentrated and treated with isopropyl up to incipient crystallization. The O,O-diacetyl-N-phenacetyl-L-cyclodopa which is obtained melts at 221°–222° C.; $[\alpha]_D^{25} = -8.4°$ (c.=0.5%; tetrahydrofuran).

Example 4

Three solutions are prepared as follows.

Solution 1.—82 g. of potassium hexacyanoferrate (III) is dissolved in 200 ml. of water.

Solution 2.—20.8 g. of sodium bicarbonate is dissolved in 400 ml. of water under argon on a steam-bath. 9.32 g. of finely powdered L-dopa is introduced into this solution and likewise brought into solution under argon on a steam-bath. The solution is then cooled to room temperature.

Solution 3.—Simultaneously with the preparation of solution 2, 80 g. of sodium bicarbonate is dissolved in 600 ml. of water on a steam-bath and cooled to room temperature. 56 g. of sodium dithionite monohydrate is introduced into the solution obtained.

Solution 1 is then immediately introduced into solution 2, with intensive stirring, and then, after 30 seconds, solution 3 is added as rapidly as possible. After 10 seconds, the mixture is treated with 280 ml. of concentrated hydrochloric acid and subsequently evaporated under reduced pressure at a bath-temperature of 40° C. After the addition of a small amount of toluene, the evaporation process is repeated. The residues from four of the batches described hereinbefore are each dissolved in a solution of 34 g. of borax in 500 ml. of water at 10° C. under argon. After the addition of 480 ml of dioxane, the solution is adjusted to pH 9 with 28% by weight aqueous sodium hydroxide and alternately treated dropwise within 2 hours at an internal temperature of 10°–15° C. with 26.4 ml. of phenylacetyl chloride and 28% by weight aqueous sodium hydroxide in such a way that the pH remains between 8.9 and 9.2. The mixture is stirred for 2 hours, then digested with 800 ml. of ethyl acetate and filtered off by suction. The residue is rinsed with a small amount of water and ethyl acetate. The organic phase is discarded. The aqueous phase is adjusted to pH 1 with 5 N hydrochloric acid and extracted three times with a total of 6 liters of ethyl acetate. The extract is washed with a saturated aqueous sodium chloride solution, dried over sodium sulphate/animal charcoal and evaporated after the addition of a small amount of toluene. The residual N-phenacetyl-L-cyclodopa is a dark oil.

Example 5

22 g. of O,O'-diacetyl-N-benzyloxycarbonyl-L-cyclodopa is dissolved in 630 ml. of ethyl acetate. An ethereal diazomethane solution is then added dropwise until it is no longer decolorized. The excess diazomethane is then removed under reduced pressure. The solution is dried over sodium sulphate and filtered. The filtrate is evaporated under reduced pressure. O,O'-diacetyl-N-benzloxycarbonyl-L-cyclodopa methyl ester is obtained.

Example 6

23 g. of crude O,O'-diacetyl-N-benzyloxycarbonyl-L-cyclodopa methyl ester is hydrogenated under normal conditions with 3 g. of palladium on animal charcoal (10%) in 200 ml. of ethyl acetate, until completion of the hydrogen uptake. The catalyst is evaporated under reduced pressure. After the addition of isopropyl ether, the evaporation process is repeated. The residual O,O'-diacetyl-L-cyclodopa methyl ester melts at 98°–99° C. after recrystallization from isopropyl ether/isopropanol.

Example 7

2.97 g. of N-phenacetyl-L-cyclodopa, 4.42 ml. of allyl bromide and 7.33 g. of powdered potassium carbonate are heated to boiling under reflux conditions in 50 ml. of absolute acetone for 21 hours. The mixture is then cooled and filtered off by suction. The residue is washed with acetone. The filtrate is evaporated under reduced pressure. The oily residue is partitioned between 200 ml. of ethyl acetate and 100 ml. of 1 N ice-cold sodium hydroxide. The organic phase is washed twice with 50 ml. of water each time, then dried over sodium sulphate, filtered and evaporated under reduced pressure. The residual O,O'-diallyl-N-phenacetyl-L-cyclodopa allyl ester melts at 74°–75° C. after recrystallization from isopropyl ether: $[\alpha]_D^{25} = 37.2°$ (c.=0.5%, tetrahydrofuran).

Example 8

22.1 g. of crude N-p-chlorobenzoyl-L-cyclodopa is dissolved under gassing with argon in 600 ml. of water and 60 ml. of 2 N sodium hydroxide. The solution is adjusted to pH 7 with acetic anhydride and then treated alternately dropwise, with stirring and ice-cooling, with 60.8 ml. of acetic anhydride and 2 N sodium hydroxide in such a way that the pH of the mixture remains between 6.5 and 7.5. The mixture is stirred for a further 2 hours at pH 6.5–7.5, then acidified to pH 1 with 6 N sulphuric acid and extracted three times with 1.5 liters of ethyl acetate each time. The organic phase is washed once with 500 ml. of a saturated aqueous sodium chloride solution and dried over sodium sulphate/animal charcoal. The filtrate is evaporated under reduced pressure at an external temperature of 40° C. The evaporation residue is purified by adsorption on 1.2 kg. of kieselgel (eluting agent: chloroform/glacial acetic acid). The O,O'-diacetyl-N-p-chlorobenzoyl-L-cyclodopa which is obtained melts at 219°–220° C. after recrystallization from acetonitrile/animal charcoal; $[\alpha]_D^{25} = -88.6°$ (c.=0.5%; glacial acetic acid).

Example 9

Three solutions are prepared as follows:

Solution 1.—82 g. of potassium hexacyanoferrate (III) is dissolved in 200 ml. of water.

Solution 2.—20.8 g. of sodium bicarbonate is dissolved in 400 ml. of water under argon on a steam-bath. Into this solution is introduced 9.32 of finely-powdered L-dopa, which is likewise dissolved under argon on a steam-bath. The solution is then cooled to room temperature.

Solution 3.—Simultaneously with the preparation of solution 2, 80 g. of sodium bicarbonate is dissolved in 600 ml. of water on a steam-bath and cooled to room temperature. 56 g. of sodium dithionite monohydrate is introduced into the cooled solution.

There are then immediately introduced into solution 2, with intensive stirring, firstly solution 1 and, after 30 seconds, as rapidly as possible, solution 3. The mixture is treated with 280 ml. of concentrated hydrochloric acid and then evaporated under reduced pressure at a bath-temperature of 40° C. After the addition of a small amount of toluene, the evaporation process is repeated. The residue contains crude L-cyclodopa (L-5,6-dihydroxy-indoline-2-carboxylic acid).

Four of the batches described hereinbefore are each dissolved in a mixture of 34 g. of borax in 500 ml. of water at 10° C. under argon. The solution is treated with 480 ml. of dioxane while being gassed with argon. The mixture is made alkaline (pH 9) with 28% by weight aqueous sodium hydroxide under ice-cooling and treated dropwise within 30 minutes with 36.5 g. of p-chlorobenzoyl chloride. The pH value is held between 8.9 and 9.2 by addition of 2 N sodium hydroxide. The mixture is stirred for a further 3½ hours, the pH value being held between 8.9 and 9.2 by occasional addition of 2 N sodium hydroxide, and then washed with 800 ml. of ethyl acetate. The aqueous phase is acidified to pH 1 with 6 N sulphuric acid, saturated with sodium chloride and extracted four times with 3 liters of ethyl acetate each time. The extract is washed four times with 500 ml. of a saturated aqueous sodium chloride solution each time, dried over sodium sulphate/animal charcoal and evaporated under reduced pressure at a bath-temperature of 30° C. N-p-chlorobenzoyl-L-cyclodopa is obtained.

The following examples illustrate pharmaceutical preparations containing the indoline derivatives provided by the invention.

Example 10

Tablets of the following composition are prepared:

|  | Mg. |
|---|---|
| O,O'-diacetyl-L-cyclodopa methyl ester | 100 |
| Lactose | 61 |
| Corn starch | 30 |
| Polyvinylpyrrolidone | 4 |
| Talcum | 5 |

The active ingredient is mixed with the lactose and the corn starch and, after the addition of a solution of polyvinylpyrrolidone in 40 ml. of ethanol, granulated. The granulate is dried at 30° C., mixed with talcum and compressed to tablets.

|  | Mg. |
|---|---|
| Individual weight of one tablet | 200 |
| Active ingredient content of one tablet | 100 |

Example 11

Gelatin capsules containing the following ingredients are prepared:

|  | Mg. |
|---|---|
| O,O'-diacetyl-N-phenacetyl-L-cyclodopa | 50 |
| Mannitol | 98.5 |
| Stearic acid | 1.5 |

The ingredients are homogeneously mixed and filled into interlocking gelatin capsules No. 2 via a capsule-filling machine.

|  | Mg. |
|---|---|
| Individual weight of one capsule | 150 |
| Active ingredient content of one capsule | 50 |

We claim:

1. A compound of the formula

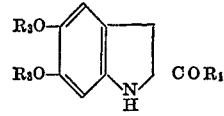

wherein $R_1$ is hydroxy or $C_{1-7}$ alkoxy; and $R_3$ is $C_{2-8}$ alkanoyl; and pharmaceutically acceptable acid addition or base salts thereof.

2. The compound of claim 1 wherein $R_1$ is hydroxy or methoxy, and $R_3$ is acetyl.

3. The compound of claim 2 wherein said compound is O,O'-diacetyl-L-cyclodopa.

4. The compound of claim 2 wherein said compound is in the L- or D,L-form.

References Cited

Wilchek et al.: Chemical Abstracts, vol. 69: 104m (1968).

Wyler et al.: Chemical Abstracts, vol. 57: 3392–3 (1962).

JOSEPH A. NARCAVAGE, Primary Examiner

U.S. Cl. X.R.

424—274; 260—471